United States Patent
Schroeder et al.

(10) Patent No.: US 6,371,877 B1
(45) Date of Patent: Apr. 16, 2002

(54) STARTER—GENERATOR SYSTEM (75) Inventors: Rolf Schroeder, Stuttgart; Guenter Woerner, Kernen; Bernd Wunsch, Schorndorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/425,895

(22) Filed: Oct. 25, 1999

(30) Foreign Application Priority Data

Oct. 24, 1998 (DE) .......................................... 198 49 051

(51) Int. Cl.$^7$ ............................. B60K 6/02; B60K 41/04
(52) U.S. Cl. ............................................... 475/5; 477/3
(58) Field of Search ........................ 475/5, 8, 10; 477/7, 477/8, 3

(56) References Cited

U.S. PATENT DOCUMENTS

| | | | |
|---|---|---|---|
| 4,862,009 A | 8/1989 | King ........................... 290/22 |
| 5,285,111 A | 2/1994 | Sherman ..................... 290/4 C |
| 5,669,842 A | * 9/1997 | Schmidt ........................ 475/5 |
| 5,846,155 A | * 12/1998 | Taniguchi et al. ............. 477/2 |
| 5,959,385 A | * 9/1999 | Kato et al. ................... 310/112 |
| 5,980,410 A | * 11/1999 | Stemler et al. ................ 475/5 |
| 6,008,545 A | * 12/1999 | Nagano et al. ............... 290/46 |

FOREIGN PATENT DOCUMENTS

| | | |
|---|---|---|
| DE | 3023277 | 1/1982 |
| DE | G 89 14 904.1 | 3/1990 |
| DE | 4112215 | 9/1992 |
| DE | 4112215 C1 | 9/1992 |
| DE | 19645943 A1 | 5/1998 |
| EP | 0 857 886 | 8/1998 |

OTHER PUBLICATIONS

British Search Report for corresponding application (GB 9924271.1) dated Dec. 24, 1999.
Copy of the International Search Report dated Jul. 6, 2001.

\* cited by examiner

*Primary Examiner*—Sherry Estremsky
(74) *Attorney, Agent, or Firm*—Crowell & Moring LLP (57) ABSTRACT

A starter—generator system for motor vehicles permits implementation of various starting methods including direct start and impulse start. The system also facilitates additional operating modes, including generator operation and/or recuperation operation. The starter-generator system electric machine which can be used as the starter and the generator is to be connected by way of a planetary drive with a shaft train situated between an internal-combustion engine and a transmission, the planetary drive being at least partially usable as a centrifugal mass for impulse starting operations.

28 Claims, 5 Drawing Sheets

STARTER—GENERATOR SYSTEM

BACKGROUND AND SUMMARY OF THE INVENTION

This application claims the priority of German application 198 49 051.8-15, filed in Germany on Oct. 24, 1998, the disclosure of which is expressly incorporated by reference herein.

The invention relates to a starter—generator system which is to be arranged between an internal-combustion engine and a transmission, particularly applications in the motor vehicle field being provided for such starter generator systems.

In the case of motor vehicles according to the current state of the art, it is generally customary to use separate starter and generator assemblies in the form of a starter and a generator. Reasons concerning the drive, the installation space and the weight indicate that such a solution does not seem to make sense in the knowledge that electric machines which can be operated as a motor as well as a generator are known. However, the torque requirement for generating the electric energy, thus for the generator operation, is several times smaller than the maximally required starting torque, which is a situation which would require a machine which is overdimensioned for the generator operation, or other measures.

In connection with vehicle concepts which have recently received increased attention, additional demands are made on the function of the starting as well as on the function of the generating of electric energy. Thus, for example, a significantly larger number of starting events occurs in connection with vehicle concepts in which the internal-combustion engine is switched off in phases in which no drive is required, thus, for example, when stopping at a traffic light, during the so-called start-stop operation of vehicles. In addition to the much higher frequency of starting events in such an operation, this operation also has the result that the number of the "cold starting events" with a particularly high required starting torque in percent relative to the sum of all starting events is significantly lower than in the case of conventionally driven vehicles, and that such starts caused by interruptions of the operation also encounter particularly favorable starting conditions with respect to the engine temperature and therefore require a particularly low starting torque which, in comparison to the starting events which frequently occur in the all-day operation during the day and are caused by usage interruptions, is still lower.

In addition, the striving for an increasingly lower fuel consumption and for operating modes which are particularly favorable for the environment also leads to thoughts about changing the kinetic energy of the vehicle in the braking operation into useful energy, thus, utilizing it, for example, for generating electric energy.

When taking these aspects into account, the demand arises for a system which, while its basic construction is the same, permits the most varied operating modes and which, in addition to the usual requirements with respect to space, weight and costs, also supplies possibilities of an extensive standardization in order to reach the required piece number degression as the result of an application range which is as wide as possible.

In addition to the systems which are still customary today and are constructed of a generator and a starter, thus of separate individual assemblies, solutions are also already known which operate with integrated starter—generator units.

In the case of such a solution known from U.S. Patent Document U.S. Pat. No. 48 62 009, the starter—generator as a drive unit is arranged coaxial to the crankshaft and is in a direct driving connection therewith. In this case, the crankshaft is connected with the planet carrier of a planetary drive which is arranged in the transition from the crankshaft to the generator consisting of the case-fixed starter and the rotor situated coaxially to the crankshaft. The rotor shaft carries the sun gear of the planetary drive in a non-rotatable manner, whose planet gears meshing with the sun gear and the ring gear are situated in a plane which is in parallel to the plane of the planet carrier but axially offset in the direction of the generator.

The rotatable ring gear is to be connected with the planet carrier by way of a bridge and a clutch which acts between the bridge and the planet carrier and locks only in one direction, and the bridge situated in the transition of the ring gear and the planet carrier, in turn, must also be connected with the case by way of a clutch which locks only in one direction. In this case, the clutch between the case and the ring gear locks counterclockwise relative to the rotating direction of the ring gear; the clutch between the planet carrier and the ring gear, again relative to the rotating direction of the ring gear, locks clockwise. This permits a starter operation with a step-down gearing and a generator operation with a rotational speed of the rotor which corresponds to the rotational crankshaft speed of the internal-combustion engine. Additional operating modes do not exist.

Another known solution, which is limited in its operating modes to the starter and generator operation, is known from German Patent Document DE 41 12 215 C1, in which case the flywheel which is situated in the transition between the crankshaft and the clutch and which is non-rotatable with respect to the crankshaft forms the planet carrier, with respect to which the rotor of the electric machine which consists of the rotor and the generator and can be used as the generator and the starter, is disposed in a coaxially rotatable manner, when non-rotatably connected with the sun gear of the planetary drive, which meshes with the planet gears carried by the planet carrier, which planet gears, in turn, mesh in the starter operation with the ring gear which is non-rotatably supported with respect to the case but is axially displaceable. As a result, in the starter operation, beginning from the starter, a gearing down takes place with a corresponding torque increase. In the generator operation, the ring gear is disengaged from the planet gears as the result of the axial displacement, and the planet carrier is connected with respect to the rotor by way of a centrifugal clutch locking in the rotating direction of the planet carrier non-rotatably connected with the crankshaft. If the rotational crankshaft speed exceeds the rotational rotor speed and the planet gears are released by the disengagement of the ring gear, as a function of the rotational speed, by way of the centrifugal clutch, the rotor is interlocked with respect to the planet carrier. This solution also does not provide additional operating modes.

Furthermore, it is known (German Patent Document DE 196 45 943 A1) to arrange a starter—generator unit in the drive train between the engine and the transmission, and by means of the rotor of the starter—generator unit a centrifugal mass can be driven which is situated in the shaft train between the engine and the transmission and can be separated from the engine and the transmission in each case by way of a clutch. In the case of this solution, in addition to the so-called direct start, in which the electric machine, as the starter, is connected with the crankshaft of the internal-combustion engine, and the starter torque is decisive for the torque available on the crankshaft in the starter operation, a so-called impulse (inertial momentum) start can be carried out, at which first the centrifugal mass is separated by way of the addressed clutches from the internal-combustion engine and the transmission and is accelerated by way of the rotor of the electric machine, and in the case of which, after a defined rotational speed has been reached, the clutch situated between the centrifugal mass and the internal-combustion engine is engaged so that, by way of the rotational energy of the centrifugal mass, the internal-combustion engine can be started. The respective starting method—direct start or impulse start—is selected as a function of the temperature of the internal-combustion engine. Although, in this known solution, the operating modes, in which the starter—generator unit can be driven, are expanded, specifically by the possibility of the impulse start, this takes place in connection with relatively large expenditures and with the elimination of the possibility of the direct start while raising the starter torque by a corresponding gearing.

An object of the invention is a starter—generator system which, while the basic mechanical construction is the same, in addition to the impulse start, permits a number of other operating modes by a different controlling of the locking devices.

The starting point in the case of the starter—generator system according to the invention is a planetary drive with assigned locking devices by way of which, corresponding to their respective control, the ring gear is to be locked with respect to the case in the sense of a case interlocking and/or the planetary drive is to be locked in itself in the sense of a planetary drive interlocking, in which case at least parts of the planetary drive can simultaneously be utilized for the impulse start as the centrifugal mass.

In a basic construction of such a starter—generator system, the starter—generator system, comprising the electric machine as well as the planetary drive, may preferably be arranged coaxially with respect to a shaft section which is situated in the shaft train forming the drive connection of the internal-combustion engine and the transmission and is non-rotatably connected with the crankshaft, but is separably connected with the manually shifted transmission by way of a driving clutch which can be operated by the driver or automatically, or in the case of automatic transmissions, with the transmission by way of clutch devices assigned thereto. The shaft section forms the bearing for the rotor of the electric machine as well as for the ring gear of the planetary drive whose planet carrier is non-rotatably connected with the shaft section.

In connection with a locking device in the form of a controllable clutch between the case and the ring gear and another locking device in the form of a controllable clutch between the ring gear and the planet carrier or between the ring gear and planetary gears, or between the ring gear and the sun gear, the preferred solution for such a planetary drive interlocking being the arrangement of the respective locking device between the ring gear and the planet carrier, in addition to the impulse start, various forms of the direct start and also different forms of the generator operation in the driving operation as well as in the recuperation operation are conceivable. Thus, it is possible, for example, to use for the impulse start only parts of the planetary drive in conjunction with the rotor as the centrifugal mass if first, for the mass acceleration, both locking devices are open and subsequently, virtually as a form of second starting phase, the case interlocking is closed, while the planetary train interlocking is open.

The planetary drive, as a whole, can be used together with the rotor as a centrifugal mass, if the impulse start is not, as described above, implemented in two but in three starting phases; specifically a first starting phase in which the planetary train interlocking and the case locking are open; a second starting phase in which the planetary train interlocking is closed and the planetary train as a whole together with the rotor forms a unit which is non-rotatable in itself, and the case interlocking is open; and in a third phase in which the planetary train interlocking is open and the case interlocking is closed. Thus the third starting phase offers the possibility for continuing, starting from an impulse start with a maximal flywheel utilization energy a starter operation in which the torque of the electric machine is correspondingly raised by the gearing-down by way of the planetary drive.

As in the case of the impulse start, in the case of the direct start, the work may take place with or without gearing, with gearing while the planetary train interlocking is open and the case interlocking is closed, without gearing when the planetary train interlocking is closed and the case train interlocking is open. Analogously to the starting operation, the generator operation is conceivable at a rotational speed corresponding to the rotational speed of the internal-combustion engine or at a rotational generator speed which is raised in comparison to the rotational speed of the internal-combustion engine in the cases of a corresponding gearing of the planetary drive. This can take into account the normal situations in the driving operation in which, at high rotational speeds of the internal-combustion engine, the generator output is normally above the requirements, but at low rotational speeds of the internal-combustion engine, it does not meet the requirements. For a generator operation at a rotational speed corresponding to the rotational speed of the internal-combustion engine, the planetary train interlocking is closed but the case interlocking is kept open; for a generator operation at a rotational generator speed raised with respect to the rotational speed of the internal-combustion engine, the planetary train interlocking is open and the case interlocking is closed.

Furthermore, the further development of a starter—generator system according to the invention also permits the recuperation operation, in which the full utilization of the respective possibility is, however, possible only in conjunction with an additional clutch in the transition from the shaft section carrying the starter—generator unit to the crankshaft of the internal-combustion engine, because then it is possible, for example, in the braking operation, to operate the generator while the internal-combustion engine is uncoupled from the direction of the output side at a rotational speed which is higher than the rotational speed of the internal-combustion engine. If no clutch is provided between the starter—generator unit and the crankshaft of the internal-combustion engine, the rotational driving speed is limited also in the recuperation operation to the rotational speed of the internal-combustion engine or to the rotational speed of the rotor which, while taking into account the gearing ratios in the planetary drive, follows from the rotational speed of the internal-combustion engine.

In a further development of the invention, it is conceivable to longitudinally divide the shaft section which is in a non-rotatable connection with the starter—generator unit, such that, on the transmission side, this shaft section is formed by a shaft piece which is non-rotatably assigned to the ring gear of the planet carrier. Such a further development offers additional variation possibilities and also permits, despite the connection of the ring gear with the transmission input shaft, during the starting phase by the interlocking of the ring gear against the case, a separation of the electric machine from the transmission, and thus the elimination of the transmission drag moment in the starting operation.

Other objects, advantages and novel features of the present invention will become apparent from the following detailed description of the invention when considered in conjunction with the accompanying drawings.

DETAILED DESCRIPTION OF THE DRAWINGS

Figure 1:
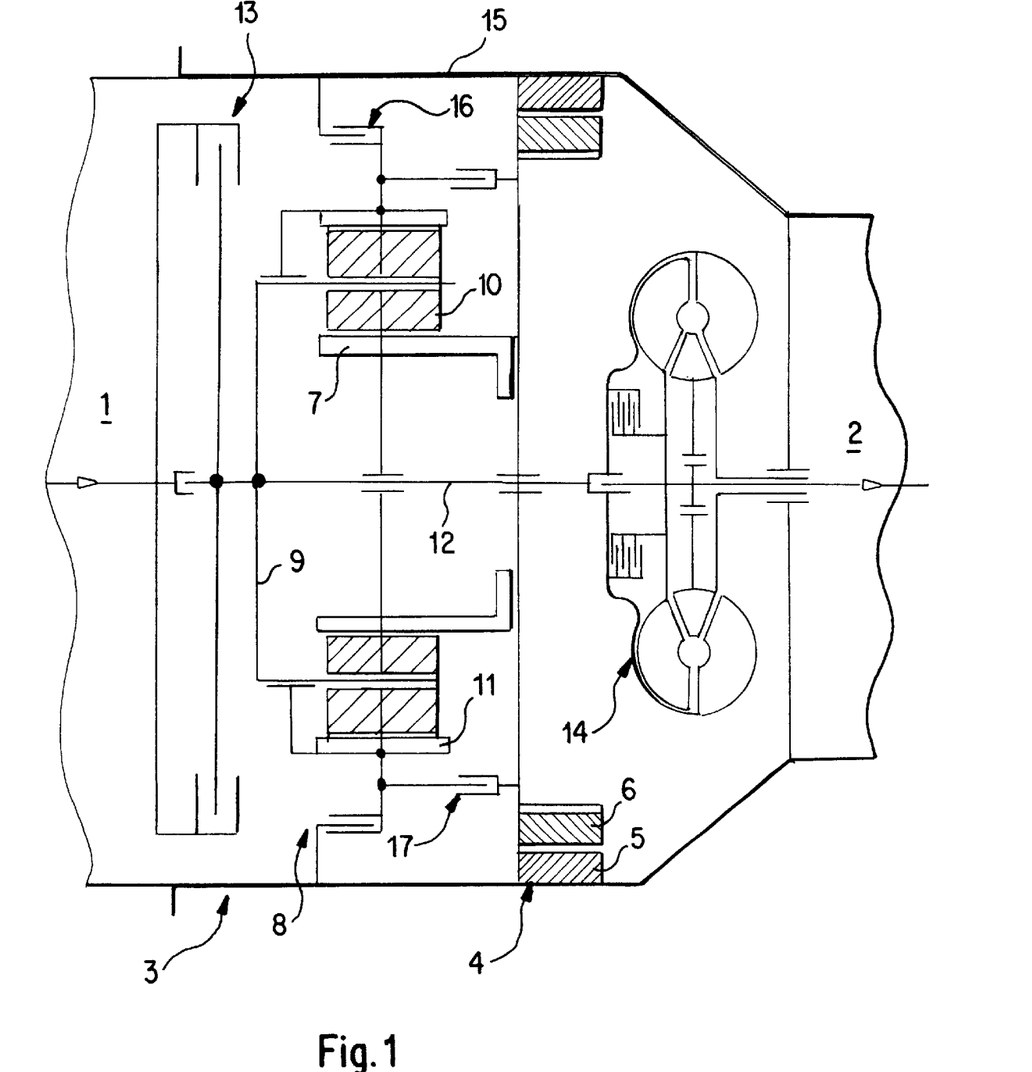
FIG. 1 is a schematic representation of a starter—generator system constructed according to a preferred embodiment of the invention.

In the schematic representation according to FIG. 1, reference number 1 shows an internal-combustion engine and reference number 2 indicates a transmission, and, in the shaft train connecting the internal-combustion engine 1 and the transmission 2, a starter—generator unit 3 is arranged coaxially with respect to the crankshaft, which is not shown, of the internal-combustion engine 1 and to the input shaft, which is not shown, of the transmission 2. The starter—generator unit 3 comprises an electric machine 4 which acts as a motor in the starter operation and as a generator for generating current and which comprises a case-fixed stator 5 and a rotor 6 to which the sun gear 7 of the planetary drive 8 is non-rotatably assigned. In addition to the sun gear 7, the planetary drive 8 comprises the planetary carrier 9, planet gears 10 and a ring gear 11 which is in a torque-transmitting connection with the sun gear 7 by way of the planet gears 10. The rotor 6, the sun gear 7, the planet carrier 9 and the ring gear 11 are arranged coaxially to one another and to the shaft section 12, which carries them, of the shaft train connecting the internal-combustion engine 1 and the transmission, the planet carrier 9 being non-rotatably connected with the shaft section 12. In the transition of the shaft section 12 to the crankshaft, which is not shown in detail, of the internal-combustion engine 1, a controllable clutch 13 is situated by way of which, in the closed condition, the shaft section 12 is non-rotatably connected with the crankshaft of the internal-combustion engine 1. Furthermore, between the ring gear and the case 15 of the starter—generator unit 3, a first controllable locking device, normally formed by a clutch 16, is provided by way of which the ring gear 10 is to be locked with respect to the case 15 (case interlocking), and, in addition, the planetary drive 8 can be locked in itself (planetary drive interlocking), specifically by way of a second controllable locking device which is preferably also constructed as a clutch 17 and which, in the embodiment of FIG. 1, interlocks the rotor or the sun gear 7 with respect to the ring gear 11 so that the planetary drive 8 forms a rigid unit and is non-rotatably connected with the shaft section 12 by way of the planet carrier 9. As a function of the respective shifting position of the first and the second locking device 16 and 17, different functional sequences and correspondingly determined operating modes are to be defined, specifically different starting methods, the generator operation and, as desired, also a recuperation operation.

Overview Table

| Clutch Operating Mode | Crankshaft Clutch -Clutch 13- | Planetary Drive Interlocking -Clutch 17- | Case Interlocking -Clutch 16- | Transmission Clutch -Clutch 14- |
|---|---|---|---|---|
| Direct Start | | | | |
| with Gearing | closed | open | closed | open |
| without Gearing | closed | | open | |
| Impulse Start Two-Phase | | | | |
| 1st Starting Phase | open | | | |
| 2nd Starting Phase | closed | open | closed | open |
| Impulse Start Three-Phase | | | | |
| 1st Starting Phase | open | | | |
| 2nd Starting Phase | closed | open | | |
| 3rd Starting Phase | closed | open | closed | open |

-continued

Overview Table

| Clutch Operating Mode | Crankshaft Clutch -Clutch 13- | Planetary Drive Interlocking -Clutch 17- | Case Interlocking -Clutch 16- | Transmission Clutch -Clutch 14- |
|---|---|---|---|---|
| Generator Operation | | | | |
| with Gearing | closed | open | closed | open or closed |
| without Gearing | closed | | open or closed | |
| Recuperator Operation | | | | |
| with Gearing | open | | closed | |
| without Gearing | open | closed | open | closed |

By using the same basic construction, possible operating modes will be explained in detail in the following, in the case of which the different clutch positions in conjunction with the different operating modes are illustrated in the above overview table.

Beginning with the starting operation, the direct start will be explained first, specifically the direct start with the gearing down, in which, relative to the representation according to FIG. 1, the electric machine 4 is used as the starter motor and the clutch 17 is opened; the planetary drive is therefore not interlocked. In contrast, the clutch 16 between the ring gear 11 and the case 15 is closed; the ring gear 11 is therefore interlocked with respect to the case 15, so that, while the rotor 6 rotates, the planet gears 10 are taken along by way of the sun gear 7 and the planet carrier 9 is driven. This planet carrier 9 is non-rotatably arranged in the shaft train 12, and, by way of the closed crankshaft clutch 13, the corresponding starter torque is transmitted to the crankshaft. By the gearing down and the thus connected torque increase, it is possible to generate the torque required for normal starting events also by means of an electric machine 4 which is not designed for the relatively high torques required for starting events but for outputs required for the generator operation.

However, as a function of the ambient temperature, starting events occur not only at average ambient temperatures and a correspondingly "cold" internal-combustion engine, but also under extremely frosty weather conditions as well as at particularly high ambient temperatures and/or a warm internal-combustion engine. If low ambient temperatures and a cold internal-combustion engine exist, particularly high starter torques are required, but when the internal-combustion engine is warmed up, comparatively low torques are required independently of the ambient temperatures. Correspondingly, it may be expedient and sufficient for starting events when the internal-combustion engine 1 is warmed up, to carry out the starting event called a direct start without any gearing, which is permitted by the fact that, when the rotor 6 is driven, the clutch 16 is open and thus the ring gear 11 is rotatable with respect to the case 15, while the clutch 17 is closed and the planetary drive 8 is therefore interlocked. The planetary drive 8 therefore forms a rigid transmission unit, and when the clutch 13 is closed, a direct connection exists of the rotor 6 to the crankshaft.

If the ambient temperatures are extremely low and the internal-combustion engine 1 is not prewarmed, even the starter torque existing during a gearing may hardly be sufficient, and such a start results particularly in a high current consumption of the electric machine 4 with a corresponding loading of the battery. This is taken into account according to the invention by the so-called impulse start, in the case of which at least parts of the planetary drive 8 are used as a centrifugal mass in order to at least trip the internal-combustion engine during the starting event by the utilization of the rotational energy of the centrifugal mass; that is, cause it to move while utilizing the rotational energy. For this purpose, in a first phase, the starter—generator unit 3 is caused to rotate by way of the rotor 6 while separating from the crankshaft of the internal-combustion engine 1—opened clutch 13. If then, in a second starting phase, the ring gear 11 is interlocked with respect to the case 15 by way of the clutch 16, and the clutch 13 between the shaft section 12 and the crankshaft of the internal-combustion engine is closed, the rotor 6 with the sun gear 7, the planet gears 10 and the planet carrier 9 form a centrifugal mass whose rotational energy is transmitted to the crankshaft by way of the clutch 13.

In such a two-phase sequence of the impulse start, the rotational energy of the ring gear 11 is not available as a centrifugal mass.

Within the scope of the invention, it is also possible, in the case of a three-phase sequence of the impulse start, to include the ring gear 11 in the centrifugal mass. If, in the first starting phase in the three-phase sequence, the planetary drive 3 is first accelerated 3 while the clutches 13, 16 and 17 are open, the planetary drive 3 is interlocked in the second starting phase by closing the clutch 17, and is therefore as a whole available as a centrifugal mass which, while the clutch 13 is closed, acts upon the crankshaft. Thus, a maximal flywheel utilization energy is made available, but for a continuation of the starting event after the tripping of the internal-combustion engine 1, a third starting phase may be required, in which the starting event is carried out while the rotor 6 is driven and the starter torque is raised by the gearing in the planetary drive. For this purpose, the ring gear 11 is interlocked with respect to the case 15 by way of the clutch 16, and the planetary drive interlocking is eliminated by opening the clutch 17.

In all starting events, the required starter torque will be the larger, the larger the masses to be accelerated, and, for this reason, the connection of the shaft train 12 with the transmission 2 is expediently interrupted during the respective starting event, for example, by opening the clutch 14. If such a clutch connection, which is releasable, does not exist, it was found to be expedient to adjust the respective transmission 2 to idling or neutral during the shifting event.

Particularly when implementing a three-stage impulse start, as described above, it may also be expedient to interrupt during the second starting phase and thus for a short time, the current supply to the electric machine or at least limit it in order to, if possible, avoid performance peaks during the coupling of the centrifugal mass formed by the planetary drive 3 to the crankshaft by closing the clutch 13 and the resulting reduction of the rotational speed.

In a reversal of the operation during the direct start, while the internal-combustion engine 1 is running, a generator operation can take place within the scope of the solution according to the invention, in which case, this generator operation can also take place with a gearing or without a gearing of the rotational crankshaft speed. If a gearing takes place, which is useful, for example, at low rotational speeds of the internal-combustion engine 1, the clutch 17, by way of which the planetary drive 3 can be locked in itself, is opened and the ring gear 11, while the clutch 16 is closed, interlocks with respect to the case 15 (case interlocking). This leads to a gearing-up; the rotor 4 therefore runs at a higher rotational speed, as a rule, at a rotational speed which is approximately three to four times higher than that of the crankshaft.

On the other hand, when the rotational speeds of the internal-combustion engine are high, no higher rotational speeds are required for the electric machine 4, and therefore no gearing has to be used. For this case, the planetary drive 8 is interlocked; the clutch 17 is therefore closed, and the case interlocking is eliminated; that is, the clutch 16 is opened and the ring gear 11 can be rotated with respect to the case 15.

Furthermore, the further development of a starter—generator system according to the invention provides the possibility of the recuperation operation, thus the possibility of utilizing the kinetic energy of the vehicle in the braking operation for generating current. Here also, the operation may again take place with a gearing or without a gearing, in which case a full utilization of the kinetic energy of the vehicle is possible only if simultaneously the driving connection between the planetary drive 8 and the crankshaft is interrupted; relative to the embodiment according to FIG. 1, the clutch 13 is therefore opened. In the recuperation operation, the torque is driven into the system by way of the transmission 2, thus from the direction of the output side, and subsequently by way of the shaft section 12 and the planet carrier 9. A gearing-up occurs when the planetary drive 3 is not interlocked; the clutch 17 is therefore opened, and by way of the closed clutch 16, a case interlocking of the ring gear 11 exists. If no gearing is desired, the planetary drive is interlocked; the clutch 17 is therefore closed; and the case interlocking is eliminated; the clutch 16 is therefore open.

Within the scope of the invention the controllably constructed clutches can be opened and closed in an overlapping manner, and data are particularly used as control parameters which have already been detected for controlling the internal-combustion engine 1 and/or the transmission 2. By means of the invention, a starter—generator system is therefore created which, while the basic construction is the same, permits a plurality of operating modes which are to be defined by the corresponding controlling of the clutches used as the locking devices.

In conjunction with a possible constructive embodiment of a starter—generator unit 3 according to FIG. 1, FIGS. 2 to 5 illustrate various expansion phases of the system, in which case the basic construction of the starter—generator unit remains largely unchanged. Reference numbers are therefore used which correspond to the schematic example according to FIG. 1 and are increased by one hundred respectively relative to FIGS. 2 and 3, and by two hundred respectively relative to FIGS. 4 and 5.

Figure 2:
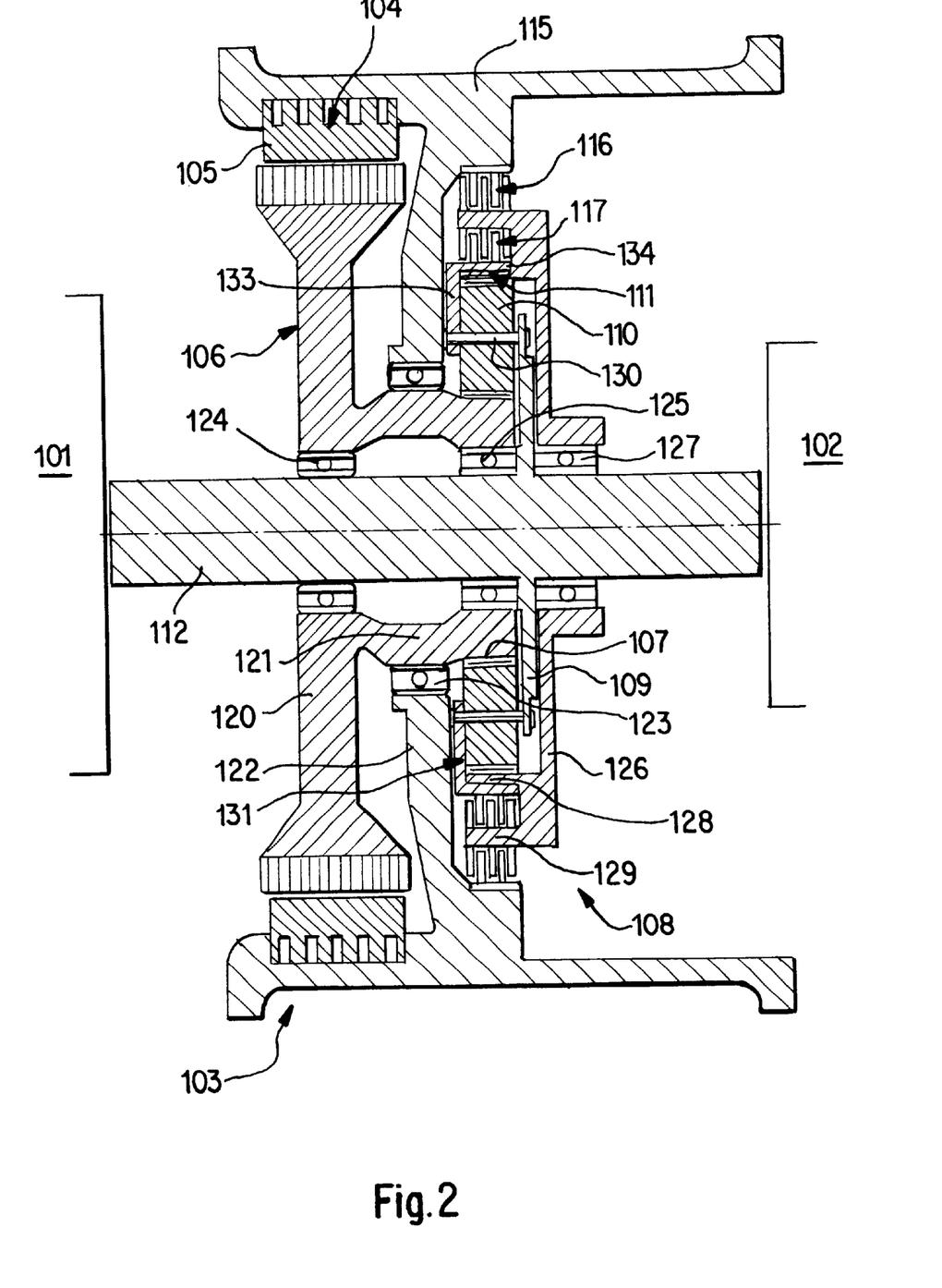
FIG. 2 is a view of a starter—generator system according to the invention in a first constructive further development with the non-rotatable assignment of the starter—generator unit to the crankshaft of the internal-combustion engine.
Figure 3:
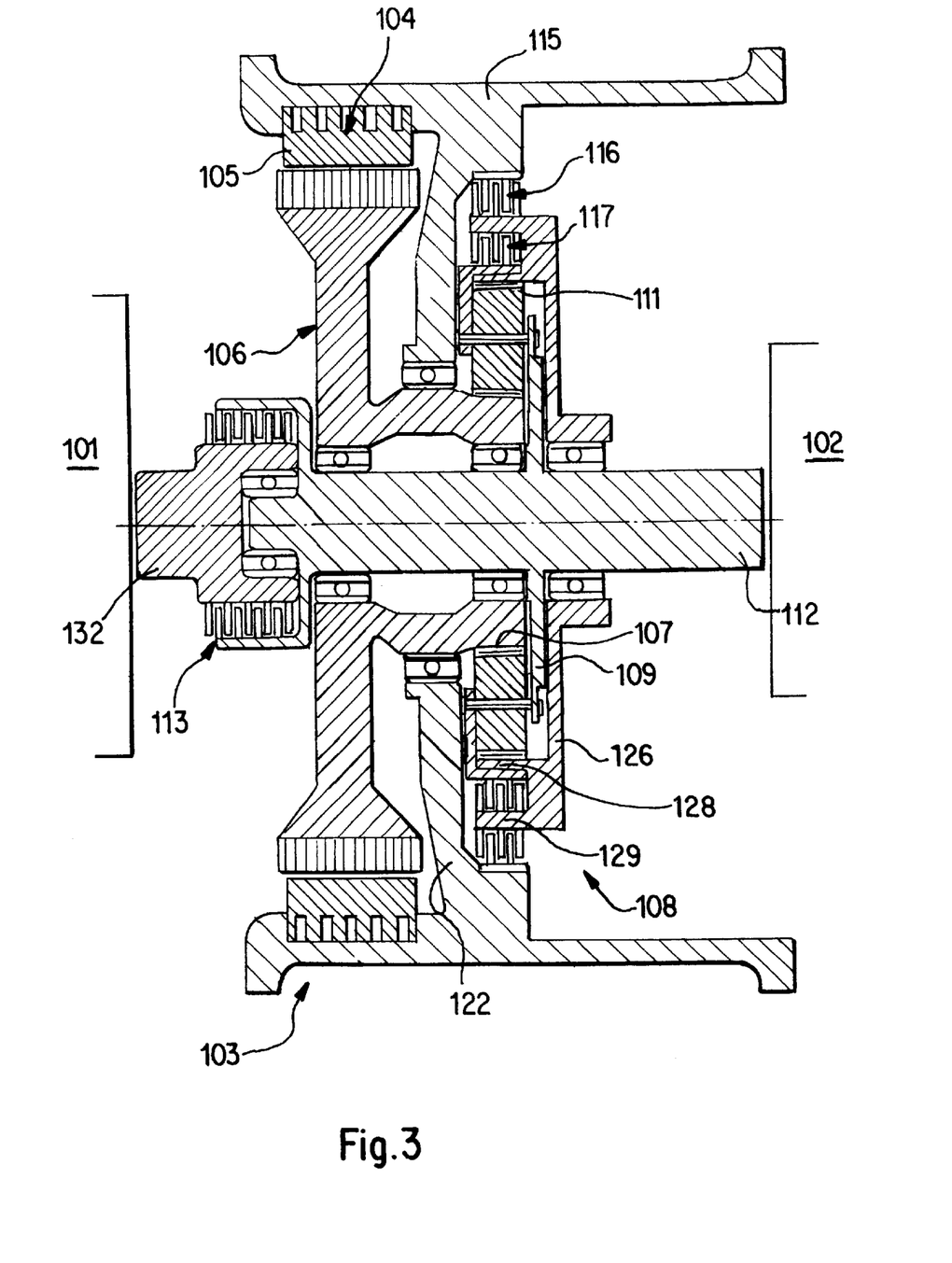
FIG. 3 is a representation corresponding to FIG. 2, in which, in the transition to the crankshaft of the internal-combustion engine, a crankshaft clutch is arranged as the driving clutch.

In FIGS. 2 and 3, reference number 101 indicates the internal-combustion engine and reference number 102 indicates the transmission. The starter—generator unit 103 comprises an electric machine 104 with a stator 105 and a rotor 106, in which case the rotor 106, while having a basic shape of an L-shaped cross-section, has a radial leg 120 and an axially extending leg 121. By way of the leg 121, the rotor 106 is disposed on the shaft section 112, in which case the axial leg 121, in the area of its free end, is non-rotatably connected with the sun gear 107 which, as a component of the planetary drive 108, is situated in a plane with the planet gears 110 and the ring gear 111 which is perpendicular to the shaft section 112. The planet gears 110 are rotatably disposed with respect to the planet carrier 109 and mesh with the sun gear 107 and the ring gear 111.

The radial leg 120 of the rotor 106 axially overlaps with the case-fixed stator 105, the case 115 carrying the stator 105 having a support 122 which is perpendicular to the shaft section 112, projects radially inward and is formed by a supporting wall or supporting ribs and against which the axial leg 121 of the rotor 106 is supported radially toward the outside in its longitudinally central area, so that the respective bearing arrangement 123 is situated axially between the bearings 124 and 125 which is provided in the area of the ends of the leg 121 and by way of which the leg 121 is supported with respect to the shaft section 122. The support 122 is situated between the radial leg 120 of the rotor 106 and the planetary drive 108, whose ring gear 111 is supported by way of a supporting ring 126 of a closed or perforated construction with respect to the shaft section 112 by way of a bearing 127. In the embodiment of FIG. 2, the ring gear 111 has, in radially outwardly stepped manner with respect to its leg 128 which carries the toothing, projects axially from the supporting ring 126 and forms a collar, another leg 129 has a ring projection, between which and the case 115, the first locking device 116 is situated by way of which the ring gear 111 can be interlocked with respect to the case 115 (case interlocking). Between the radially exterior leg 129 and the radially interior leg 128, a second controllable locking device 117 is situated by way of which the planet carrier 109 can be interlocked with respect to the ring gear 111 (planetary drive interlocking), for the purpose of which the planet carrier 109 in the embodiment shown has a ring body 131 carried by way of the shafts 130 of the planet gears 110, which ring body 131 interacts with the second locking device 117 and can be interlocked with respect to the ring gear 111 by way of this locking device 117, the ring body 131 having a radial leg 133 and an axial leg 134 which extends while overlapping with the leg 128 of the ring gear 111.

The locking devices 116 and 117 are shown only schematically. Naturally, it would, for example, also be conceivable within the scope of the invention to arrange the locking devices 116 and 117 formed by the clutches in a different manner, for example, axially, and not in a radially mutually offset manner, in which case the axial offset could be achieved according to the invention in that the leg pertaining to the ring gear 111 would be mounted situated axially opposite the locking device 116 with respect to the leg 128 on the supporting ring 126. As a result, radial space could be saved, particularly in connection with a correspondingly smaller diameter of the stator 105 and the rotor 106, to the extent that such a diameter reduction would be acceptable for power reasons.

If the starter—generator unit 103 according to FIG. 2 is used, as illustrated there, in a direct linking of the shaft section 112 to the crankshaft, which is not shown in detail, of the internal-combustion engine 101, thus without the use of a crankshaft clutch, and only with a transmission-side possibility for interrupting the drive train, either in the form of a clutch or in the form of a corresponding neutral shifting of the transmission 102, despite the reduced expenditures, the operating modes explained by means of FIG. 1, with the exception of those of the recuperation operation, can be implemented to an unlimited extent. In contrast, the recuperation operation can be carried out only to a limited extent because, as the result of the non-separable connection of the shaft section 112 with the crankshaft, no higher rotational speeds can be introduced from the output side into the planetary transmission than defined by the rotational speed of the crankshaft. Otherwise, the statements concerning FIG. 1 and the description of the operating modes with respect to FIG. 1 and the control positions defined therefor are valid, in which case, in the further development according to FIG. 2, as well as in the further developments according to FIGS. 3 to 5, the transmission interlocking takes place in a manner which deviates from the embodiment according to FIG. 1, between the ring gear and the planet carrier and not between the ring gear and the sun gear.

In the embodiment according to FIG. 3, as a supplement to the further development according to FIG. 2 and while the same reference numbers are valid, analogously to FIG. 1, a clutch 113 is provided between the shaft section 112 and the schematically illustrated crankshaft 132 of the internal-combustion engine 101, but, deviating from the previous descriptions, a connection of the shaft section 112 is provided with the input shaft, which is not shown, of the transmission 102 without the insertion of a clutch. Such a further development may prove to be expedient as a cost-reducing variant, particularly in vehicles in which the transmission 102 non-rotatably connected with the shaft section 112 has only low centrifugal masses and/or in the case of which, because of the overall concept, an efficient recuperation operation is particularly important, but the required starting torques are not so high that, in the impulse or direct start, they could not also be applied in the case of a fixedly connected and thus dragged transmission 102. In addition to cost aspects, such a construction may also result in space advantages, in which case, such a construction, as mentioned above, because of the separation of the crankshaft 132 from the shaft section 112 made possible by way of the clutch 113, also permits a full recuperation operation.

Figure 4:
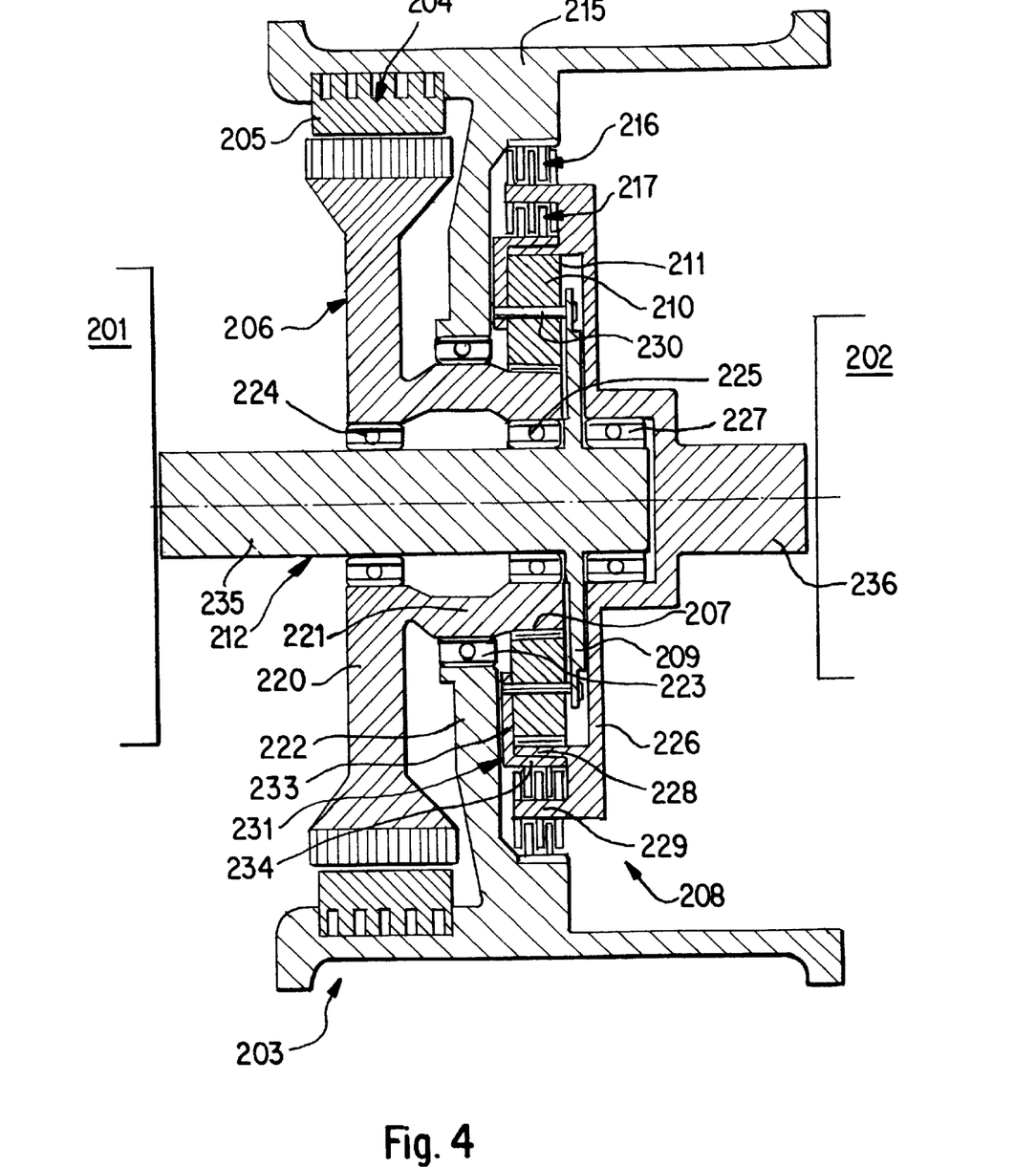
FIG. 4 is a representation which corresponds to FIG. 1 with a non-rotatable connection of the starter—generator unit to the crankshaft of the internal-combustion engine and the formation of the transmission-side portion of the shaft train between the internal-combustion engine and the transmission by the ring gear of the planetary drive.
Figure 5:
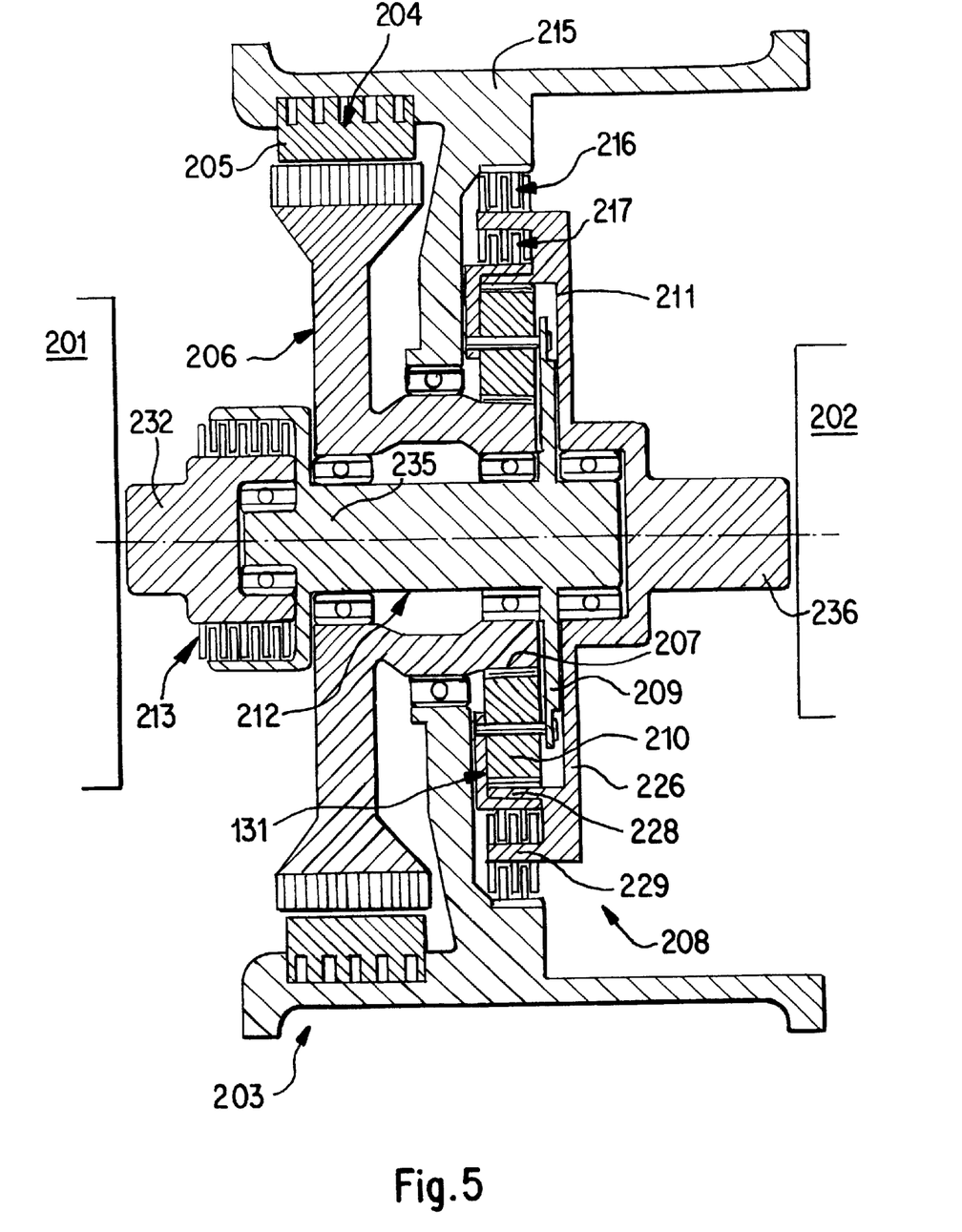
FIG. 5 is a representation corresponding to FIG. 4 with an additional crankshaft clutch as the driving clutch between the internal-combustion engine and the starter—generator unit.

The further developments according to FIGS. 4 and 5 illustrate solutions in which, while using the same basic concept, the planetary drive, as mentioned above, now having reference number 208, is utilized as the result of the further development of its ring gear 211, for dividing the shaft section 212 into an internal-combustion-side shaft piece 235 and a transmission-side shaft piece 236, in which case the internal-combustion-side shaft piece 235 still carries the bearings 224 and 225 for the rotor 206 as well as the bearing 227 for the ring gear. The ring gear 211, in turn, ends axially in the shaft piece 236 by way of which the connection to the transmission 202 is established.

In this solution, in which the ring gear 211 of the planetary drive 208 is connected with the transmission input shaft, the drive takes place by way of the interlocked planetary drive 208, so that, by way of the clutch 217 between the planet carrier 209 and the ring gear 211, the separation between the internal-combustion engine 201 and the transmission 202 can also take place, so that, in a basic version, a minimal number of clutches can be used. If no additional clutches are provided in the transition from the shaft section 235 to the crankshaft of the internal-combustion engine 201 and/or in the transition from the shaft piece 236 in the transition to the transmission 202, because of the direct linking to the crankshaft of the internal-combustion engine 201, only a limited recuperation operation can be carried out. This further development also has the result that, because of the interlocking of the planet carrier 211—closed clutch 217— required for the driving operation, the generator operation can take place only at the rotational speed corresponding to the rotational speed of the internal-combustion engine. Since the starting operation, whether as a direct start or as an impulse start, as a rule, takes place when the vehicle is stationary, and thus the planet carrier 211 may also be interlocked with respect to the case 215 by a closing of the clutch 216, the further development according to FIG. 4, also in its basic version, does not result in any limitations of these operating modes.

With respect to FIG. 4, FIG. 5 illustrates a solution in which a clutch 213 is provided in the transition to the crankshaft of the internal-combustion engine 201, so that the shaft section 212 consisting of the shaft pieces 235 and 236, as a whole, that is, with the parts disposed thereon, can be utilized as a centrifugal mass and a recuperation operation can also be carried out, but without any gearing. This also does not change if another clutch may optionally be arranged between the shaft section 236 and the transmission input shaft. However, in connection with such an additional clutch arrangement, as is conceivable according to the invention, particularly large centrifugal masses can be achieved for the impulse start if the impulse start is carried out in three phases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Starter—generator system, which is arranged in use between an internal-combustion engine and a transmission, comprising:

a stator fixed to a case and a rotor forming an electric starter-generator machine, and     a planetary drive which is in a driving connection with a shaft train which connects an internal-combustion engine and a transmission, said planetary drive including:

(i) a ring gear,

(ii) a planet carrier with planet gears,

(iii) a sun gear non-rotatably connected with the rotor,       (iv) a first controllable locking device operable to interlock the ring gear with respect to the case for case interlocking operations during a portion of startup of said engine, and       (v) a second controllable locking device operable to interlock the ring gear with gear for planetary drive interlocking operations during another portion of startup of said engine,     wherein said starter-generator system is operable in a plurality of operating modes including a centrifugal mass starting operation mode having a first starting phase with said planetary drive out of driving connection with the shaft train and with parts of the planetary drive forming a centrifugal mass accelerated with the rotor and a second starting phase with the accelerated centrifugal mass in driving connection with the shaft train.

2. Starter—generator system according to claim 1, wherein the centrifugal mass can be coupled in a superimposed manner with respect to the starter drive taking place by way of the rotor of the electric machine in the second starting phase of the centrifugal mass starting operation.

3. Starter—generator system according to claim 2, wherein following the second starting phase operating while utilizing the energy of the centrifugal mass, the starter drive takes place exclusively by way of the electric machine in a third starting phase.

4. Starter—generator system according to claim 1, wherein the rotor can be coupled in a freely rotating manner as part of the centrifugal mass into the shaft train leading to the internal-combustion engine in the second starting phase of the centrifugal mass starting operation.

5. Starter—generator system according to claim 4, wherein following the second starting phase operating while utilizing the energy of the centrifugal mass, the starter drive takes place exclusively by way of the electric machine in a third starting phase.

6. Starter—generator system according to claim 5, wherein the direct start can be carried out while the drive takes place without gearing by way of the planetary drive.

7. Starter—generator system according to claim 1, wherein said plurality of operating modes includes starting without utilizing the centrifugal mass formed with the parts of the planetary drive and with a one-phase direct start by the electric machine.

8. Starter—generator system according to claim 7, wherein the direct start can be carried out by means of a gearing-down taking place by way of the planetary drive.

9. Starter—generator system according to claim 1, wherein the second locking device is situated between the ring gear and the rotor.

10. Starter—generator system according to claim 1, wherein the second locking device is situated between the ring gear and the planet carrier.

11. Starter—generator system according to claim 1, wherein the shaft train between the internal-combustion engine and the transmission has a shaft section with respect to which the electric machine and the planetary drive are arranged in a coaxial manner.

12. Starter—generator system according to claim 11, wherein the shaft section is non-rotatably connected with the planet carrier.

13. Starter—generator system according to claim 12, wherein the shaft section is connected by way of a clutch with the crankshaft of the internal-combustion engine.

14. Starter—generator system according to claim 12, wherein the shaft section is connected with the transmission by way of a clutch.

15. Starter—generator system according to claim 11, wherein the shaft section is connected by way of a clutch with the crankshaft of the internal-combustion engine.

16. Starter—generator system according to claim 15, wherein the shaft section is connected with the transmission by way of a clutch.

17. Starter—generator system according to claim 11, wherein the shaft section is connected with the transmission by way of a clutch.

18. Starter—generator system according to claim 11, wherein the shaft section is longitudinally divided and, on the transmission side, has a shaft piece which is non-rotatably assigned to the ring gear of the planetary drive.

19. Starter—generator system according to claim 1, wherein the ring gear has a ring projection which is formed by an axially extending leg, to which ring projection, radially on the outside, as a case interlocking, the first locking device and radially on the inside, as the planetary drive interlocking, the second locking device is assigned.

20. Starter—generator system according to claim 19, wherein the ring projection is situated at a radial distance from a collar of the ring gear which is formed by an axially protruding leg and against which the planet gears of the planetary drive are supported.

21. Starter—generator system according to claim 20, wherein the ring projection and the collar axially overlap one another.

22. Starter—generator system according to claim 20, wherein the ring projection and the collar are axially opposite.

23. Starter—generator system according to claim 1, wherein one clutch respectively is provided as the controllable locking devices.

24. A starter-generator system for a motor vehicle according to claim 1, wherein said starter-generator system is selectively operable in further operating modes, including:
    a direct starting mode with a one to one driving rotation connection of the rotor and the drive shaft train, and
    a direct starting mode with a geared driving rotation connection of the rotor and the drive shaft train via the planetary drive.

25. A starter-generator system for a motor vehicle according to claim 24, wherein said further operating mode includes:
    a recuperator operation mode with a direct drive from a transmission shaft to the rotor, and
    a recuperator operation mode with a geared driving connection of the transmission shaft and the rotor via the planetary drive.

26. A starter-generator system for a motor vehicle according to claim 24, wherein said further operating modes includes:
    a generator operation mode with a one to one driving rotation connection of the rotor and the drive shaft train, and
    a generator operation mode with a geared driving rotation connection of the rotor and the drive shaft train via the planetary drive.

27. A starter-generator system for a motor vehicle according to claim 26, wherein said further operating mode includes:
    a recuperator operation mode with a direct drive from a transmission shaft to the rotor, and
    a recuperator operation mode with a geared driving connection of the transmission shaft and the rotor via the planetary drive.

28. A starter-generator system for a motor vehicle according to claim 1, wherein said further operating mode includes:
    a recuperator operation mode with a direct drive from a transmission shaft to the rotor, and
    a recuperator operation mode with a geared driving connection of the transmission shaft and the rotor via the planetary drive.

* * * * *